(12) United States Patent
Tsang et al.

(10) Patent No.: US 7,543,092 B2
(45) Date of Patent: Jun. 2, 2009

(54) SIGNAL PROCESSING SYSTEM FOR REDUCING POWER CONSUMPTION

(75) Inventors: Wing Hon Tsang, North Point (HK); Ronald Chiu, Quarry Bay (HK)

(73) Assignee: Thomson Licensing, Boulogne-Billancourt (FR)

( * ) Notice: Subject to any disclaimer, the term of this patent is extended or adjusted under 35 U.S.C. 154(b) by 705 days.

(21) Appl. No.: 10/543,806

(22) PCT Filed: Jan. 28, 2004

(86) PCT No.: PCT/EP2004/000722

§ 371 (c)(1),
(2), (4) Date: Jul. 29, 2005

(87) PCT Pub. No.: WO2004/070615

PCT Pub. Date: Aug. 19, 2004

(65) Prior Publication Data

US 2006/0179190 A1    Aug. 10, 2006

(30) Foreign Application Priority Data

Feb. 4, 2003 (EP) .................................. 03290271

(51) Int. Cl.
*G06F 13/42* (2006.01)
(52) U.S. Cl. .................. 710/105; 710/106; 713/323
(58) Field of Classification Search .......... 710/8–12, 710/104–110, 306–311; 345/74–75, 214–215, 345/157, 291; 713/320, 323
See application file for complete search history.

(56) References Cited

U.S. PATENT DOCUMENTS

| 5,021,775 | A | * | 6/1991 | Babin ........................ 345/213 |
| 5,563,622 | A | * | 10/1996 | Person et al. ............. 345/75.1 |
| 5,664,124 | A | * | 9/1997 | Katz et al. ................. 710/315 |
| 5,852,406 | A | | 12/1998 | Edde et al. |
| 6,002,882 | A | * | 12/1999 | Garde ........................ 712/35 |
| 6,457,078 | B1 | * | 9/2002 | Magro et al. ............... 710/105 |
| 2001/0005874 | A1 | * | 6/2001 | Domon ...................... 710/129 |

OTHER PUBLICATIONS

Search Report dated Jul. 9, 2004.
US 5,909,590, 06/1999, Garde (withdrawn)

* cited by examiner

Primary Examiner—Raymond N Phan
(74) Attorney, Agent, or Firm—Robert D. Shedd; Joseph J. Opalach; Catherine A. Ferguson

(57) ABSTRACT

A system for data communication purposes in electronic devices comprises a data bus comprising first, second, third and forth signal paths. A first control means generates a first state of a control signal in the presence of a clock signal in a first mode of operation. The first operation mode may be the normal operation mode of a consumer electronic apparatus. A second control means generates a second state of the control signal in the presence of a clock signal in a second mode of operation. The second operation mode may be the stand-by mode of the consumer electronic apparatus. The system can be easily integrated into existing systems utilizing e.g. a VFD protocol.

13 Claims, 3 Drawing Sheets

SIGNAL PROCESSING SYSTEM FOR REDUCING POWER CONSUMPTION

Figure 1:
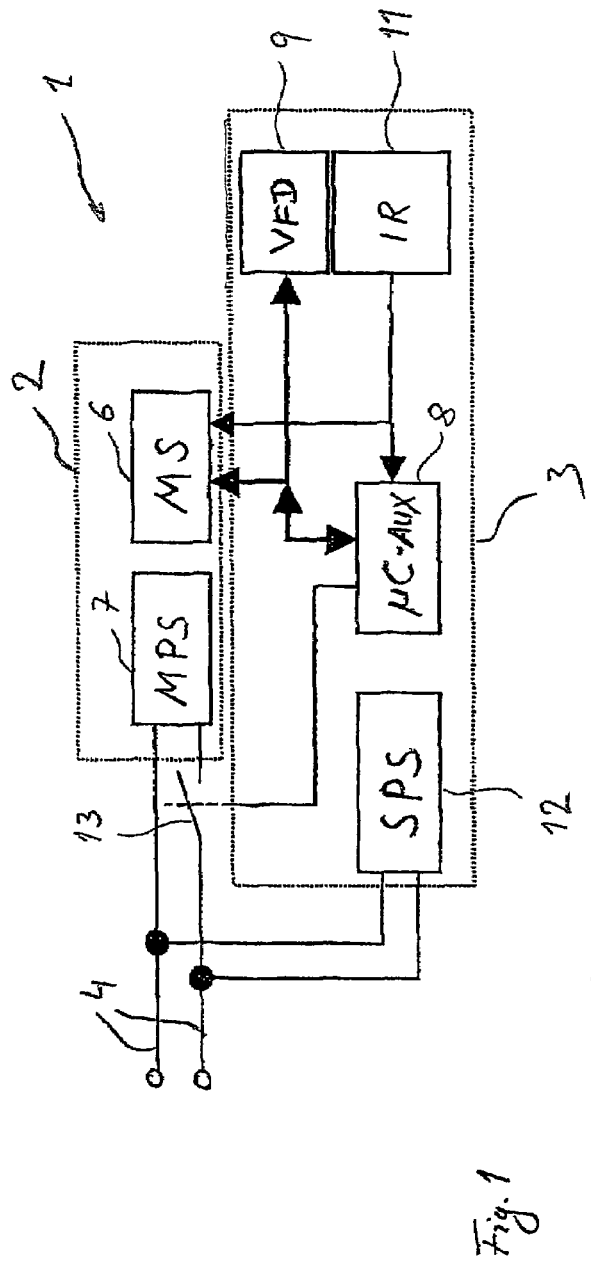

This application claims the benefit, under 35 U.S.C. § 365 of International Application PCT/EP04/000722, filed Jan. 28, 2004, which was published in accordance with PCT Article 21(2) on Aug. 19, 2004 in English and which claims the benefit of European patent application No. 03290271.0, filed Feb. 4, 2003.

The present invention involves signal processing system controlled via a data bus such as a serial data bus. Signal processing systems such as those in consumer electronics devices typically include digital integrated circuits (ICs) that implement various functions. For example, in a television receiver, ICs provide signal processing functions including tuning, video processing, and audio processing. In addition, a microcomputer (μC) IC controls the operation of the other ICs by writing data, such as control parameters, to the ICs and reading data, such as status data, from the ICs. Information is communicated between the ICs and the control μC via a data bus such as a serial data bus.

In EP 0 693 729 A1 a multi-protocol 3-wire data bus system is described. The known serial data bus system comprises a data bus including two clock lines and a data line. A controller generates a first clock signal (SCL) and a first data signal (DATA) according to a first serial data bus protocol (IIC) during a first mode of operation of the system, and generates a second clock signal (CLOCK) and a second data signal (DATA) according to a second serial data bus protocol (IM) during a second mode of operation. The first clock signal (SCL) and the first data signal (DATA) are provided on the first and third signal paths, respectively, during the first mode of operation. The second clock signal (CLOCK) and the second data signal (DATA) are provided on the second and third signal paths, respectively, during the second mode of operation.

The technical teaching of the multi-protocol data bus system cannot be applied to a 4-wire data bus system operated by means of a protocol called a VFD protocol. A practical application of the VFD protocol is presented in the following.

According to the European Regulation (IEC 60107-1 (100A/5FDIS)), the stand-by power consumption of consumer electronic devices like e.g. TVs or VCRs have to be reduced to a maximum of 5 Watt after Jan. 1, 2001, a maximum of 3 Watt after Jan. 1, 2003 and a maximum of 1 Watt after Jan. 1, 2005. In principle it is possible to use a mechanical switch on the device to turn it into a complete "off" state, i.e. the device is entirely inoperative. Then, on the one hand the power consumption of the device is reduced to zero. On the other hand, it is not possible for the user to conveniently turn the device again into the "on" state by an infrared remote control because also the infrared receiver of the device inoperative.

In order to avoid this disadvantage the EP 0 158 251 A1 proposes to maintain a remote control receiver in an operating state while the main system is switched off.

The realization of this general concept disclosed in EP 0 158 251 A1 based on the VFD protocol for a 4-wire serial data bus requires an independent communication channel between the main system and an auxiliary controller controlling the infrared receiver. However, while this approach provides the desired low energy consumption and user convenience it increases the overall manufacturing costs of the system.

It is therefore desirable to suggest a signal processing system that alleviates the above-mentioned limitations.

The invention proposes a signal processing system comprising a data bus comprising first, second, third and forth signal paths. A first control means generates a first state of a control signal in the presence of a clock signal in a first mode of operation. The first operation mode may be the normal operation mode of a consumer electronic apparatus. A second control means generates a second state of the control signal in the presence of a clock signal in a second mode of operation. The second operation mode may be the stand-by mode of the consumer electronic apparatus.

In an advantageous embodiment of the invention the first control means apply a VFD protocol in the first mode of operation. As control signal a strobe signal may be chosen.

The signal processing system according to the invention can advantageously be integrated into any existing system, which has a VFD driver for display. The basic idea of the invention is to have two logical channels on only one physical wiring. There is no confusion in the existing communication. For the extension of the existing VFD protocol only two things have to be done:

Software has to be added for the sharing of communication hardware interfaces to communicate with the VFD driver and an auxiliary driver, which is operative during the stand-by mode. In addition the associating protocol for the auxiliary control has to be incorporated as well.

Advantageously the existing 4-line connection can be used and no additional line is necessary to incorporate the new operability. The auxiliary driver is capable of performing sub-system control for the main system and the control message and acknowledgement message can be passed through the associating protocol in full duplex way. Finally the protocol can easily be adapted to any bit length message.

Figure 2:
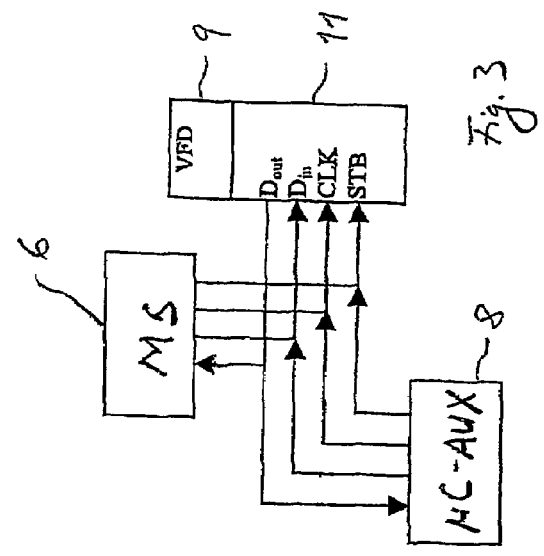

In the drawing an exemplary embodiment of the present invention is illustrated. It shows FIG. 1 a system overview of a device comprising the inventive signal processing system;

FIG. 2 the data bus communication connection

Figure 3:
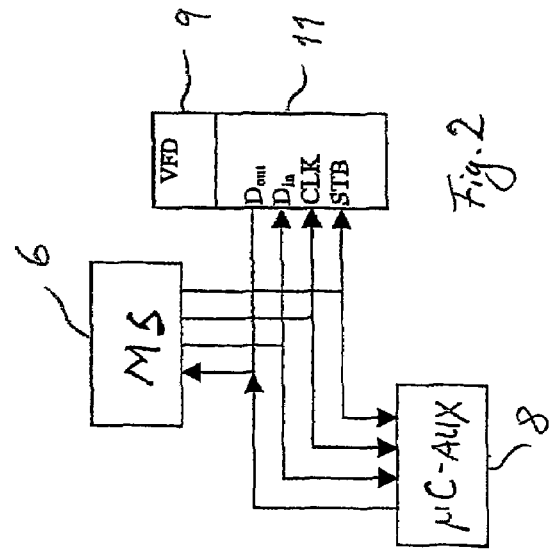
Figure 4:
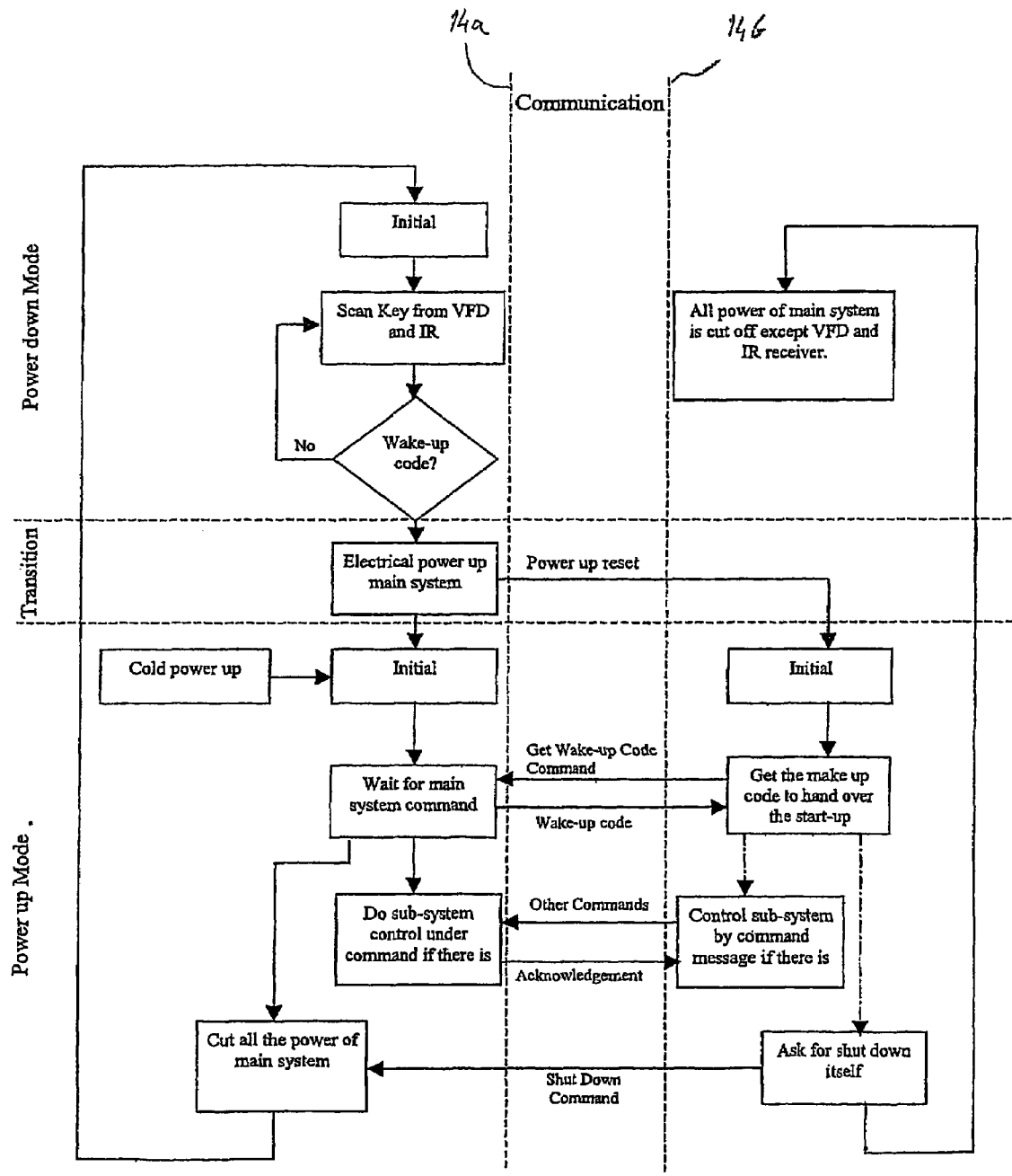
Figure 5:
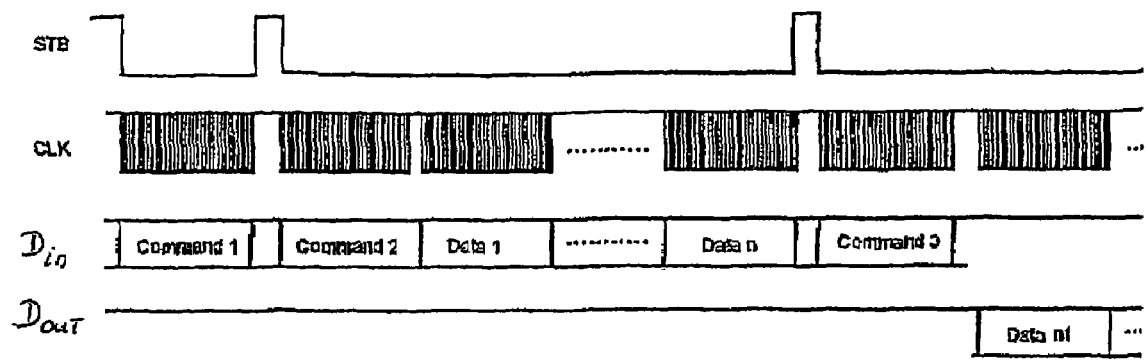
Figure 6:
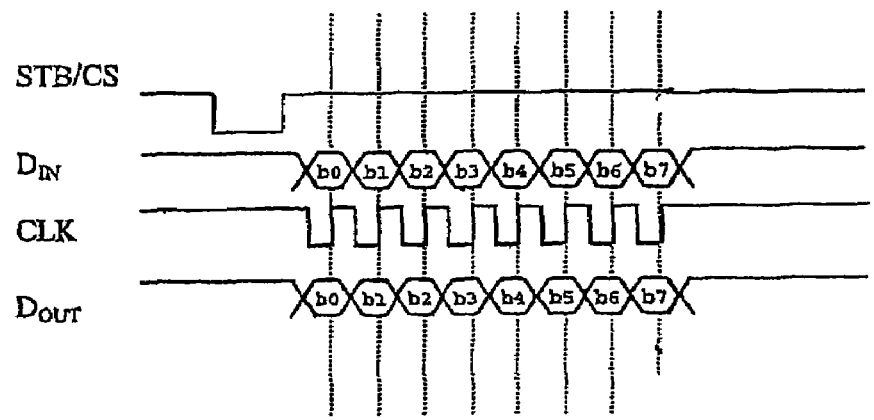

FIG. 3 the data bus communication in the power-down mode;

FIG. 4 a flow diagram of the communication system;

FIGS. 5 and 6 waveforms illustrating operating modes of the signal processing system.

In FIG. 1 the general structure of a consumer electronics apparatus 1 is shown in a schematic way. The apparatus 1 is structured in a first and a second portion 2, 3, which are both supplied with power from a main power line 4. The first portion 2 comprises a main system 6, which is supplied by a main power supply 7. The main system 6 may include the media drives of a VCR or a DVD player, signal processing circuits etc. In any case the main system 6 includes all elements and components exhibiting a high power consumption.

The second portion 3 of the apparatus 1 comprises an auxiliary controller 8, a VFD driver 9 (e.g. the μPD16315 commercially available from NEC Corporation), an IR receiver 11 and a stand-by power supply 12. The auxiliary controller 8 communicates with the VFD driver 9 via a 4-wire serial data bus system. The stand-by power supply permanently supplies all elements of portion 3 with power as soon as the apparatus 1 is connected to mains. In addition, the auxiliary controller 8 controls a relay 13 to selectively turn on or off the main power supply 7 of the apparatus 1. In stand-by mode the relay 13 is not conducting and the power consumption of the apparatus 1 is reduced to e.g. 1 Watt.

In FIGS. 2 and 3 the VFD communication connection is shown in greater detail.

In the power-up mode shown in FIG. 2 the auxiliary controller is working as another VFD driver and connected in parallel.

The main system communicates with the VFD driver using original VFD protocol and with controller using associating VFD protocol, which will be described in greater detail below. The $D_{out}$ of VFD driver must be an open-collector output. If not, additional interface logic must be added.

In the power-down mode shown in FIG. 3 the auxiliary controller becomes a host to poll the key from the front panel and detect the key from IR remote receiver. It uses the original VFD protocol to receive the front panel key signal.

The bus attached to main system 6 is assumed to have high impedance when the auxiliary controller switches the main power supply off. The auxiliary controller re-configures the I/O direction in the power-down and power-up mode.

The flow diagram in FIG. 4 illustrates the communication between the auxiliary controller 8 and the main system 6. The doted lines 14a, 14b in the diagram separate the hardware levels of the auxiliary controller 8 and the main system 6 with the communication level in between. The horizontal doted lines 15a, 15b separate the two operating modes of the apparatus 1, i.e. power-up and power-down mode, respectively, and a transition mode between the two operating modes.

In FIG. 5 a typical example of a VFD protocol is shown, which uses a strobe STB signal and a clock CLK signal simultaneously to feed in the command or data into the VFD driver 9. The command is distinguished from the data by the first byte following the falling edge of the STB signal. As can be seen in FIG. 5 the STB signal is always low associated with clock signal to shift data to or from the VFD driver 9.

In the design of an associating VFD protocol several criteria must be met:

The associating VFD protocol must not confuse the original VFD protocol in order to avoid any perturbation of the VFD driver in normal operation. This is achievable if the VFD driver is arranged such that it can easily ignore the associate protocol. The associating VFD protocol must be easily distinguishable from the original VFD protocol by the auxiliary controller 8. And finally, the associating VFD protocol must contain a start signature (or header) to inform the auxiliary controller 8 that it is his turn to exchange the data with main system. Of course, the VFD driver 9 ignores this signature and does not affect the incoming data in the protocol.

In FIG. 6 the proposed associate VFD protocol is illustrated. In the associate VFD protocol the strobe low signal before the clock signal is used as the start signature. It is important to note that on the one hand the strobe signal is always kept high in the presence of the clock signal so that it will not affect the original VFD protocol. On the other hand, the auxiliary controller 8 can easily distinguish the original VFD protocol by detecting the strobe signal in the presence of the clock signal whether the strobe signal keeps low, otherwise, it must be the associating VFD protocol.

In the original VFD protocol the strobe signal STB is low when a clock signal CLK is present. In contrary, in the associating VFD protocol the strobe signal STB is high when a clock signal CLK is present.

The invention claimed is:

1. A signal processing system comprising:
a first portion which is selectively supplied with power; and
a second portion having a first driver and an auxiliary controller, which is permanently supplied with power when the signal processing system is connected to a power line,
wherein the first portion communicates a clock signal with the driver via a data path of a data bus using a first protocol, and communicates a clock signal with the auxiliary controller via a same data path of said data bus using a second protocol which is distinguished from the first protocol.

2. The signal processing system according to claim 1, wherein,
in a first mode of the system, the first portion is power up and the auxiliary controller is working as a second driver under control of the first portion; and
in a second mode of the system, the first portion is power down and the auxiliary controller determines whether to switch the signal processing system to the first mode according to a key.

3. The signal processing system according to claim 1, wherein the data bus is a four-wire serial data bus, four paths of which are shared by the first driver and the auxiliary controller to communicate with the first portion in the first protocol and the second protocol separately.

4. The signal processing system according to claim 1, wherein an output of the first driver is an open-collector.

5. The signal processing system according to claim 1, wherein a strobe signal and a clock signal are simultaneously used to feed one of a command and data into the first driver in the first protocol.

6. The signal processing system according to claim 1, wherein the second protocol comprises a start signature to inform the auxiliary controller that it is time to exchange data with the first portion.

7. The signal processing system according to claim 2, wherein the second portion further comprises a receiver from which the auxiliary controller scans the key in the second mode to switch the system into the first mode.

8. The signal processing system according to claim 2, wherein in the second mode the auxiliary controller scans the key from a front panel to switch the system into the first mode.

9. The signal processing system according to claim 2, wherein a relay is provided between the power line and the first portion, and the relay is controlled by the auxiliary controller to power up the first portion in the first mode and power down the first portion in the second mode.

10. The signal processing system according to claim 8, wherein the auxiliary controller receives the key from the front panel using the first protocol.

11. The signal processing system according to claim 5, wherein the strobe signal is low before the clock signal is used as the start signature in the second protocol.

12. The signal processing system according to claim 11, wherein the strobe signal is high during the clock signal in the second protocol.

13. The signal processing system according to claim 11, wherein the strobe signal is low during the clock signal in the first protocol.

* * * * *